US005345383A

United States Patent [19]

Vance

[11] Patent Number: 5,345,383

[45] Date of Patent: Sep. 6, 1994

[54] METHOD AND APPARATUS FOR SELECTIVELY MONITORING INPUT

[75] Inventor: Ricky D. Vance, Washington, Ill.

[73] Assignee: Caterpillar Inc., Peoria, Ill.

[21] Appl. No.: 150,347

[22] Filed: Nov. 10, 1993

Related U.S. Application Data

[63] Continuation of Ser. No. 945,461, Sep. 16, 1992, abandoned.

[51] Int. Cl.[5] ........ G01M 15/00; G06F 15/20

[52] U.S. Cl. ........ 364/424.03; 364/424.04; 364/550

[58] Field of Search ........ 364/424.01, 424.03, 364/424.04, 551.01, 550; 340/438, 439

[56] References Cited

U.S. PATENT DOCUMENTS

| | | | |
|---|---|---|---|
| 3,516,063 | 6/1970 | Arkin et al. | 340/163 |
| 4,223,302 | 9/1980 | Hocking | 340/525 |
| 4,551,801 | 11/1985 | Sokol | 364/424 |
| 4,644,479 | 2/1987 | Kemper et al. | 364/550 |
| 4,757,454 | 7/1988 | Hisatake et al. | 364/424 |
| 4,804,937 | 2/1989 | Barbiaux et al. | 340/52 F |
| 4,862,395 | 8/1989 | Fey et al. | 364/561 |
| 4,924,418 | 5/1990 | Bachman et al. | 364/550 |
| 4,967,143 | 10/1990 | Raviglione et al. | 324/73.1 |
| 4,975,846 | 12/1990 | Abe et al. | 364/424.03 |
| 4,975,847 | 12/1990 | Abe et al. | 364/424.03 |
| 4,975,848 | 12/1990 | Abe et al. | 364/424.03 |
| 4,977,389 | 12/1990 | Shiraishi | 340/461 |
| 5,034,889 | 7/1991 | Abe | 364/424.04 |
| 5,041,980 | 8/1991 | Maddock et al. | 364/431.03 |
| 5,050,080 | 9/1991 | Abe | 364/424.04 |
| 5,056,023 | 10/1991 | Abe | 364/424.03 |
| 5,091,858 | 2/1992 | Paielli | 364/431.12 |
| 5,150,609 | 9/1992 | Ebner et al. | 73/117.3 |
| 5,157,610 | 10/1992 | Asano et al. | 364/424.03 |
| 5,214,582 | 5/1993 | Gray | 364/424.03 |
| 5,257,190 | 10/1993 | Crane | 364/424.03 |

FOREIGN PATENT DOCUMENTS

WO92/04693 3/1992 PCT Int'l Appl. .

OTHER PUBLICATIONS

Caterpillar Service Manual–"Systems Operation Testing and Adjusting–Computerized Monitoring System with Liquid Crystal Display" published on or about Oct. 1990.

Caterpillar Service Manual–Computerized Monitoring System With LCD Bargraph Gauges–dated Nov. 1991.

*Primary Examiner*—Thomas G. Black
*Assistant Examiner*—Julie D. Day
*Attorney, Agent, or Firm*—Steven R. Janda

[57] ABSTRACT

Instruments, for example monitoring and diagnostic systems, are often designed to operate in connection with a variety of machine types. Advantageously, the instrument may receive data for each parameter from either the sensor directly or from another controller depending on the machine to which it is connected. The subject invention provides a method and apparatus for selectively receiving data from one of a plurality of sources. A plurality of sensors produce signals in response to sensed parameters and deliver a first group of one or more signals to an instrument via a wire harness. A control receives a second group of one or more of the sensor signals and responsively delivers the second group to the instrument via a communication link. A processor determines whether one of the plurality of sensor signals is being delivered via the wire harness or the communication link and responsively monitors one of the wire harness and communication link.

9 Claims, 4 Drawing Sheets

METHOD AND APPARATUS FOR SELECTIVELY MONITORING INPUT

This is a continuation of application Ser. No. 07/945,461, filed Sept. 16, 1992, now abandoned.

TECHNICAL FIELD

The invention relates generally to selectively receiving data and, more particularly, to a method and apparatus for selecting one of a plurality of input lines from which desired data may be obtained.

BACKGROUND ART

In a variety of machines, such as engine-powered vehicles, instruments are employed to detect the presence of various undesirable operating conditions, such as overheating of the engine, sensor failure, low oil pressure, low fuel, and the like, and indicators are provided to warn the operator of such conditions. For example, these instruments may include monitoring systems, diagnostic systems, or control systems and are often designed to operate in connection with a variety of machine types.

These instruments are typically connected to various sensors and switches for monitoring or controlling conditions on the vehicle via a wire harness and/or a communication link. In many applications, these instruments are also connected to electronic control systems such as electronic engine controls, electronic transmission controls, and the like.

Since these instruments may be used in connection with many different machines, it is advantageous for the instruments to be as flexible as possible. Lower costs are achieved and less warehousing space are required if a single instrument is manufactured which can be used in many different applications. Similarly, service time is reduced if software changes are avoided when an instrument is moved from one machine to another or when an electronic control is added to an existing machine as an attachment.

Most prior art systems have included dedicated instruments in which the functions and conditions of the vehicle to be monitored or diagnosed, as well as the particular sensors provided on the vehicle are identified in advance. Hence, the instrument is specifically designed for and hence "dedicated" to the monitoring of those particular vehicle functions and conditions in response to signals from the particular, pre-identified associated sensors. Accordingly, such "dedicated" instruments generally cannot be readily modified in the field to accommodate different machines, different sensors and/or different conditions and functions. Rather, such instruments are generally limited to use with a particular machine type or a particular group of attachments for which the instrument has been designed.

However, a manufacturer of monitoring or diagnostic equipment need not provide a totally new monitoring system for each vehicle or each variation in vehicle sensors or functions to be monitored. While some prior art systems have provided for standardized monitoring systems, for example the system shown in U.S. Pat. No. 4,551,801, this monitoring system is still relatively inflexible and requires the addition or subtraction of monitoring modules and the use of decals to indicate the parameters being shown by each display module.

In connection with some machines, parameter data is obtained by the instrument from a sensor wired directly to the instrument, while in connection with other machines data for monitored parameters is obtained from an electronic control via a communication link.

If an instrument is unable to receive data from either source, different instruments must be manufactured for use in connection with each machine type or the software within a computerized instrument must be modified. The instrument display should also be able to be reconfigured while on the vehicle to receive data from a different source with little or no work required from the serviceman.

In some cases, the use of vehicle identification codes to determine which source will deliver data to the instrument may be used, however, vehicle identification codes are insufficient in the event that electronic controls are added as attachments to a vehicle. Identification codes also may not be feasible if the amount of information that may be conveyed by the identification code is limited by harness connector pin availability since each bit of the identification code requires a connector pin.

As an example of an electronic control being added to a machine as an attachment, a machine having a mechanical shifting transmission that is later equipped with an electronic transmission control will have the engine speed sensor wiring rerouted from the instrument display to the electronic transmission control because data delivered to the transmission control must be in real time. Since the instrument is no longer reading the engine speed sensor, the diagnostics for that sensor must be disabled. Also, since the engine speed data will now be read from the communications link, the diagnostics for a loss of signal on the communications link must be enabled.

The present invention is directed to overcoming one or more of the problems set forth above.

DISCLOSURE OF THE INVENTION

The invention avoids the disadvantages of known monitoring and diagnosis systems and provides a flexible instrument capable of receiving an input signal from one of a plurality of sources.

In one aspect of the invention, an apparatus for selectively receiving data from one of a plurality of sources is provided. A plurality of sensors produce sensor signals in response to sensed parameters and deliver a first group of one or more of the sensor signals to an instrument via a wire harness. A control receives a second group of one or more of the sensor signals and responsively delivers the second group to the instrument via a communication link. A processor determines whether one of the plurality of sensor signals is being delivered via the wire harness or the communication link and responsively monitors one of the wire harness and communication link.

In another aspect of the invention, a method for selectively receiving data from one of a plurality of sources is provided including the steps of producing a plurality of sensor signals in response to sensed parameters, delivering a first group of one or more of said sensor signals to an instrument via a wire harness, delivering a second group of one or more of said sensor signals to a control and responsively delivering said second group from the control to the instrument via a communication link, and determining whether one of the sensor signals is being delivered via the wire harness or the communication link and responsively monitoring one of the wire harness and communication link.

The invention also includes other features and advantages which will become apparent from a more detailed study of the drawings and specification.

BRIEF DESCRIPTION OF THE DRAWINGS

For a better understanding of the present invention, reference may be made to the accompanying drawings in which.

BEST MODE FOR CARRYING OUT THE INVENTION

Figure 1:
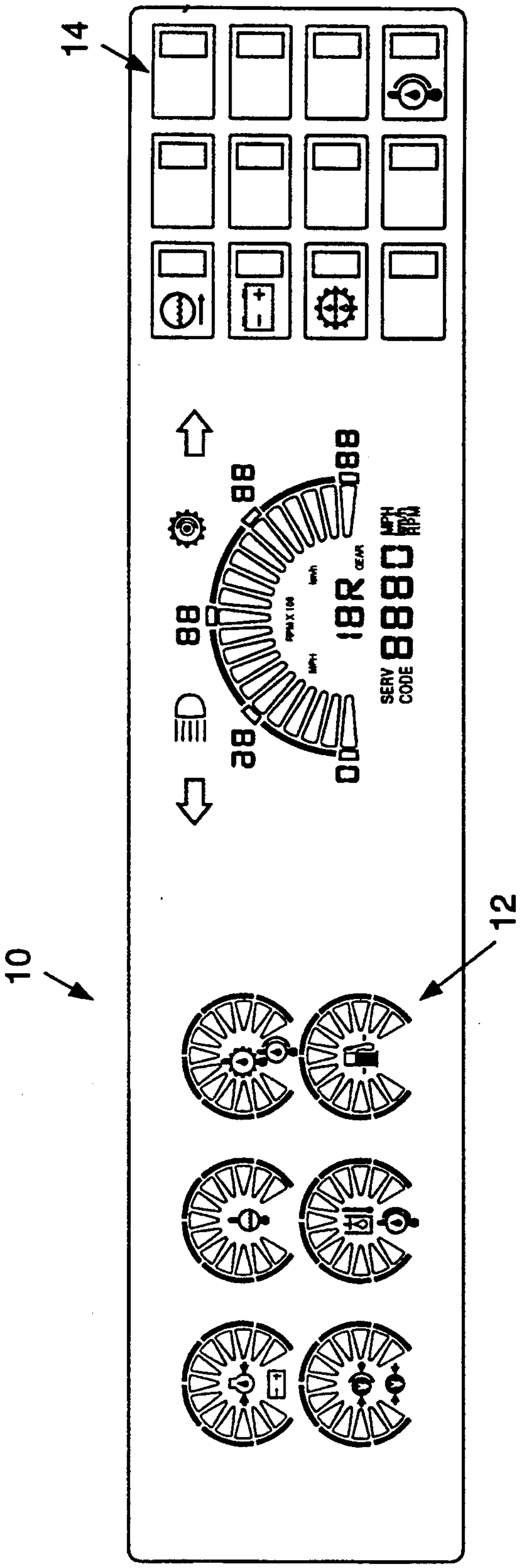
FIG. 1 is an illustration of a computerized diagnostic and monitoring system used in connection with a preferred embodiment of the invention.

An instrument for selectively receiving data from one of a plurality of sources is shown generally by the reference numeral 10 in FIG. 1. In the preferred embodiment, the instrument 10 is a computerized diagnostic and monitoring system for monitoring and displaying parameters and informing an operator by visible and/or audible indications when a warning condition exists. The instrument 10 advantageously includes a plurality of electronic gauges 12 and indicator lights 14. The instrument 10 preferably indicates the level of a plurality of sensed parameters, for example, ground speed, engine RPM, oil temperature, fuel level, transmission oil temperature, and the like. Warning conditions are brought to an operator's attention by one or more of the indicator lights 14 being lit, by a flashing gauge, and/or a horn. Advantageously, the indicator lights are lit in response to switch-type inputs being in a warning state. The instrument 10 also advantageously includes displays for indicating such things as turn signal operation, hi-beam light operation, and transmission gear. The instrument is advantageously microprocessor based and functions in response to internal software. In the preferred embodiment, the instrument also performs diagnostic functions relating to the sensor inputs.

The instrument 10 illustrated in FIG. 1 is sufficiently flexible to be used in connection with a number of different machines and to indicate a number of different parameters. For example, each gauge, except the gauge preferably indicating speedo/tacho information, is capable of indicating either a high warning condition or a low warning condition. In a preferred embodiment, the gauge 12 includes a plurality of indicating segments and the two most clockwise oriented and counter-clockwise oriented segments indicate the high and low warning conditions, respectively.

To indicate the level of a parameter having a high warning condition, for example hydraulic oil temperature, the two most clockwise oriented segments are enabled and a high outline segment adjacent the clockwise oriented warning segments is illuminated. The indicating segments are progressively illuminated in the clockwise direction as the sensed parameter increases from a low level to a high warning level. To indicate the level of a parameter having a low warning condition, for example fuel level, the two most counter-clockwise oriented segments are enabled and a low outline segment adjacent the counter-clockwise oriented warning segments is illuminated. The indicating segments are illuminated to indicate the sensed parameter being at a high level and progressively turned off in the counter-clockwise direction as the sensed parameter decreases from the high level to a low warning level.

In the case of the level of the parameter exceeding a high warning value, all of the indicating segments plus either one or two of the clockwise oriented warning segments are caused to flash depending on the degree to which the parameter level exceeds the high warning value. If the level of the sensed parameter decreases below a low warning value, one or two of the most counter-clockwise oriented warning segments are caused to flash depending on the degree to which the parameter level is below the low warning value. In some cases, it is advantageous to indicate the level of parameters having both high and low warning conditions.

One of several ISO symbols may be illuminated in connection with each gauge 12 thus allowing each gauge to be programmed to indicate the level of one of several different parameters. Likewise, the parameters associated with the indicator lights 14 may be redefined for each machine type on which the instrument 10 may be used.

Advantageously, each machine type has an identification code to be delivered to the instrument which responsively reconfigures itself in response to the layout chosen by the designer of that machine type. In response to the identification code, the instrument 10 determines the parameter monitored at each input, the particular data that is displayed on each gauge, the status report level for each input, which gauges are used, the signal filtering, debounce, scaling, or averaging characteristics associated with each input, and the functional relationship between each parameter value and the gauge reading.

The instrument 10 advantageously includes diagnostic functions for each sensor signal being received from the wire harness 18. For example, if the sensor is of the pulse-width modulated type, a predefined range of duty cycles may be established. If the sensor's duty cycle is outside the range, a fault is diagnosed.

Figure 2:
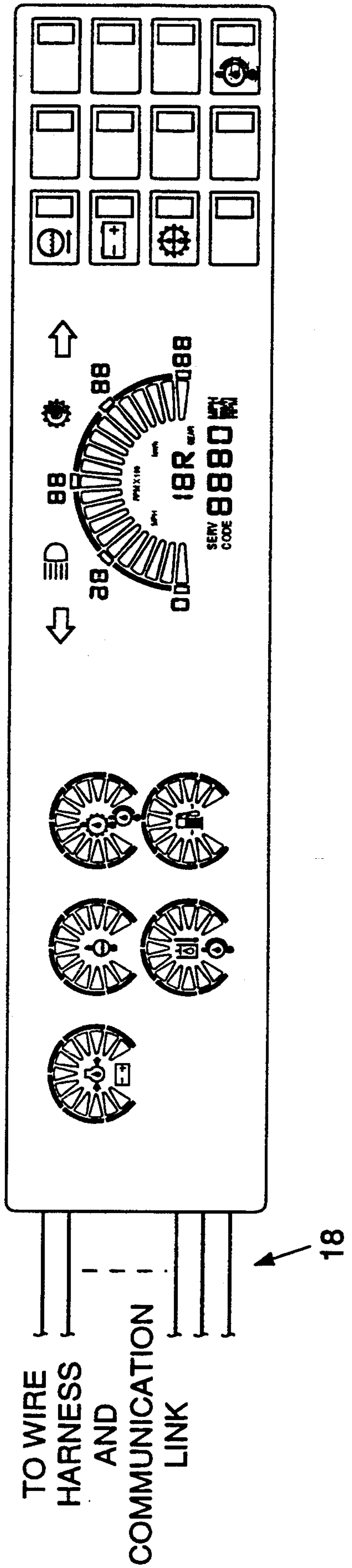
FIG. 2 is an illustration of a computerized diagnostic and monitoring system having a plurality of inputs used in connection with a preferred embodiment of the invention.

As shown in FIG. 2, the instrument 10 selects a group of gauges and a gauge configuration for each parameter to be indicated on the machine type of interest in response to the identification code. In many cases, all of the gauges 12 will not be used. Similarly, only one of the ISO symbols on each gauge will be used and each gauge will typically only indicate a high or a low warning condition, however, some sensed parameters may require both a high and a low warning condition.

Figure 3:
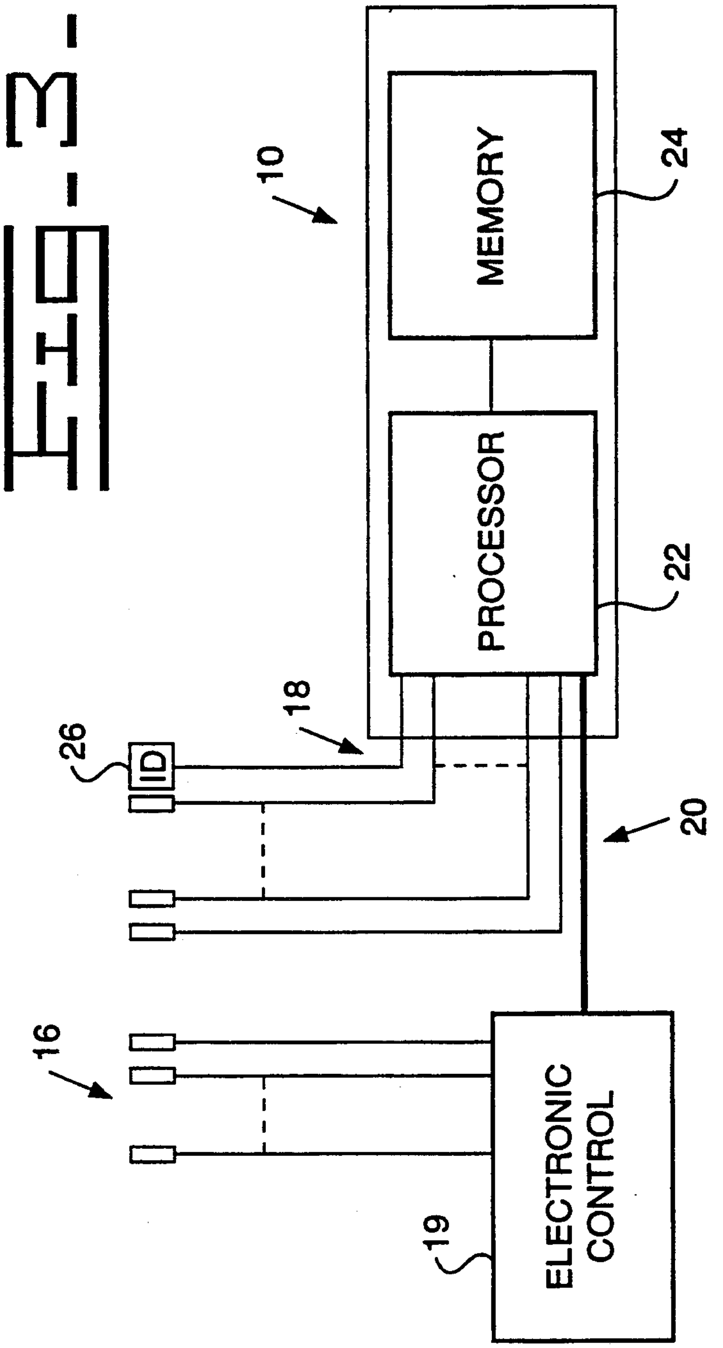
FIG. 3 is a diagrammatic illustration of the interconnection of certain aspects of the present invention.

Referring primarily to FIG. 3, the instrument 10 is connected to a plurality of sensors 16 and a means 26 for producing an identification code by wires in a wire harness 18. In the preferred embodiment, the means 26 for producing an identification code connects one or more wires to either a "logic 1" or a "logic 0" signal. The resulting series of binary signals comprises the identification code and is delivered to the instrument 10 via the wire harness 18. Advantageously, the means 26 for producing an identification code is an integral part of the wire harness 18.

When used in connection with some machine types or attachments, the instrument 10 also is connected to one or more electronic controls 19 via a communication link 20. In the preferred embodiment, the communication link 20 is a two-way serial communication link.

The electronic control 19, for example an electronic engine control or an electronic transmission control, advantageously receives sensor signals related to the functions of the electronic control directly from the sensors 16 since it is important for such electronic controls 19 to receive information on a real time-basis. In addition to performing various control functions in response to the sensor signals, the electronic control 19 converts the received sensor signals to a binary, serial signal in a manner well-known in the art and delivers the serial signal to the instrument 10 via the communication link 20. In response to the serial signal, the instrument 10 displays the level of the sensed parameters or warning conditions on the gauges 12 or indicator lights 14. It should be appreciated that means of communication other than serial may be used without departing from the spirit of the invention.

The instrument also includes a processor 22 and a memory unit 24. The processor receives signals from the sensors 16, a means 26 for producing an identification code, and the electronic control 19. The memory unit 24 is used to store a variety of information including one or more flags for indicating the source of data being received by the processor 22 and is preferably of the EEPROM type, as is well-known in the art.

Figure 4:
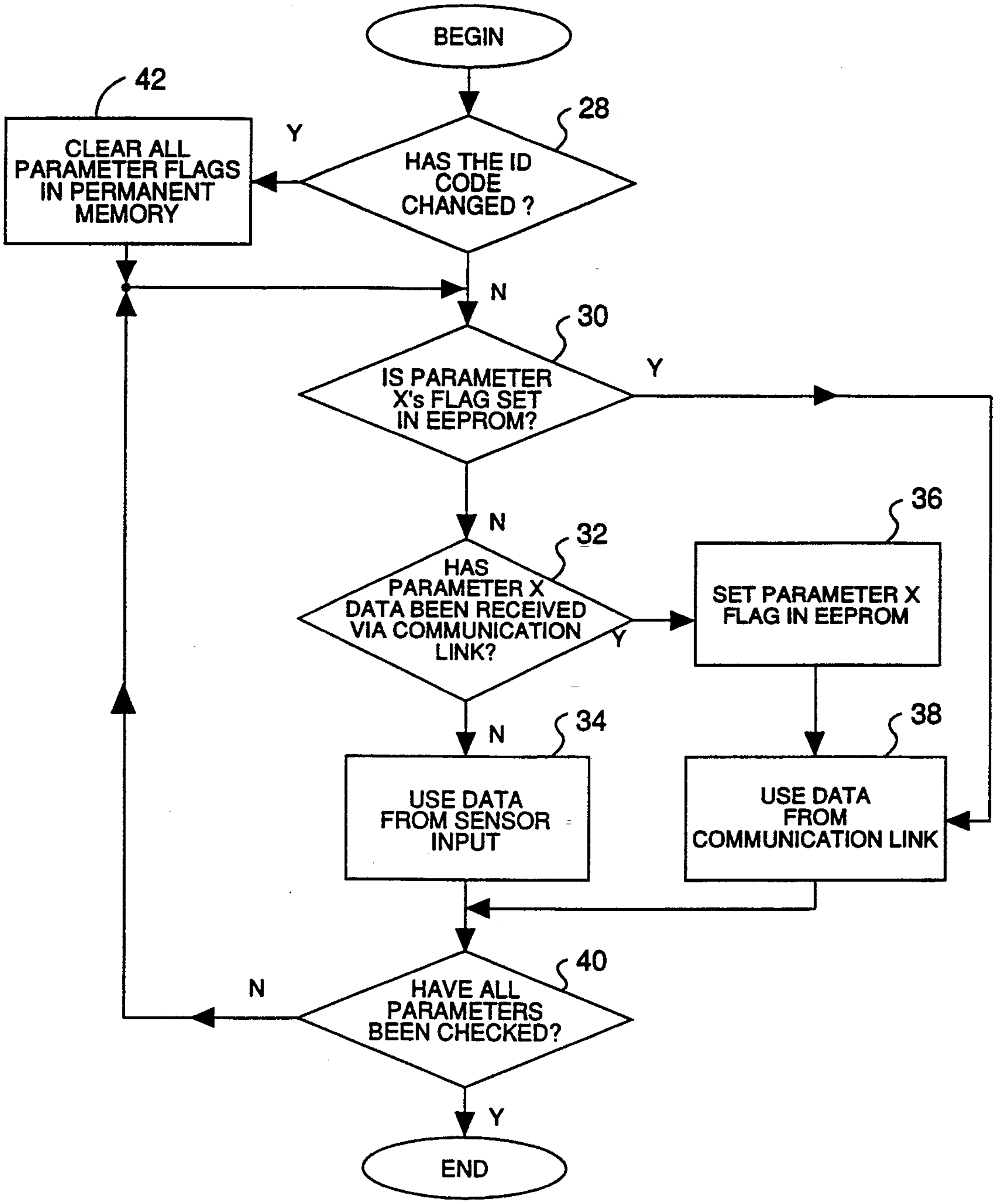
FIG. 4 is a flow chart of an algorithm used in connection with a preferred embodiment of the invention.

In accordance with a preferred embodiment of the invention, the processor 22 executes the algorithm illustrated in FIG. 4. For the purposes of explanation, any sensed parameter used in connection with the invention is referred to generally as parameter X.

The processor 22 determines 28 whether the identification code has been changed by comparing the currently received identification code to an identification code stored in memory 24.

If the identification code has not changed, the processor determines whether parameter X's flag is set in memory 24. If parameter X's flag is set in memory 24, the processor 22 uses 38 data corresponding to parameter X from the communication link 20.

If parameter X's flag is not set in memory 24, the processor 22 determines 32 whether data corresponding to parameter X has been received from the communication link 20. If data has been received from the communication link, then the processor 22 sets 36 parameter X's flag in memory 24 and uses 38 data from the communication link 20.

If data has not been received from the communication link 20, the processor 22 uses data from the sensors 16 via the wire harness 18. The functions represented by blocks 30–38 are repeated for each parameter being utilized by the instrument 10. Following blocks 34 and 38, if all parameters have not been checked 40, control is passed back to block 30.

If the currently received identification code is different from that stored in memory 24, as determined in block 28, then the flags associated with all parameters are cleared 42 and control is passed to block 30.

In response to parameter X's flag being set, the sensor diagnostic functions within the instrument for determining whether a valid signal is being delivered are disabled since the information relating to that parameter is being received by the electronic control 19 rather than the instrument 10. In addition, communication link diagnostics are enabled for determining whether the signal for parameter X is being received from the communication link 20. If the parameter's flag is set in permanent memory and the elapsed time since the parameters data was last received exceeds the update period, the communication link 20 will be diagnosed as faulty and the gauge 12 or indicator light 14 driven by the parameters data will indicate an out of range condition.

INDUSTRIAL APPLICABILITY

The operation of an embodiment of the present invention is best described in relation to its use in instruments 10 for monitoring a plurality of sensed parameters and/or diagnosing a plurality of fault conditions. In some applications, the sensors 16 are all connected directly to the instrument 10. In other applications, some of the sensors 16 are connected to an electronic control 19 which utilizes the parameter information and transmits binary, serial signals representing the sensor signals to the instrument 10.

The invention allows the instrument display to determine which source will deliver data for each of its monitored parameters. A series of "flags" are maintained in memory. If the flag for a given parameter is set, the instrument display will only receive that parameter's data via the communication link, the sensor diagnostics for that parameter are disabled, and the communication link diagnostics for that parameter are enabled. If the flag for a given parameter is not set, the instrument display will look at it's sensor inputs for the parameter data and the sensor diagnostics are enabled. Also each parameter has an update period. If the parameter's flag is set in memory and the elapsed time since the parameters data was last received exceeds the update period, the communication link will be diagnosed as faulty and the gauge or indicator light driven by the parameters data will indicate an out of range condition.

Since it is conceivable that an instrument display that has "learned" to receive data from the communication link would be taken off one vehicle and put on another, the instrument display must be able to learn where the data is sourced on the new vehicle. To allow for that contingency, the instrument display clears all parameter flags in its memory whenever a new vehicle harness code is read. As parameter data is received via the communication link on the new vehicle, the instrument display sets the appropriate parameter flags in memory to configure itself for the new vehicle.

Any specific values used in the above descriptions should be viewed as exemplary only and not as limitations. Other aspects, objects, and advantages of this invention can be obtained from a study of the drawings, the disclosure, and the appended claims.

I claim:

1. An apparatus for selectively receiving data from one of a plurality of sources, comprising:

a plurality of sensor means for producing sensor signals in response to sensed parameters;

instrument means for receiving a first group of one or more of said sensor signals via a wire harness;

control means for receiving a second group of one or more of said sensor signals and responsively delivering said second group to said instrument means via a communication link; and processing means for determining whether one of said plurality of sensor signals is being delivered via said wire harness or said communication link and for responsively monitoring one of said wire harness and communication link.

2. An apparatus, as set forth in claim 1, wherein said processing means includes a flag means for indicating whether each sensor signal is being delivered via said wire harness or said communication link.

3. An apparatus, as set forth in claim 2, including means for producing a vehicle identification code and for delivering said vehicle identification code to said instrument means, and wherein said processing means senses a change in said vehicle identification code and responsively clears said flag means and determines whether the sensor signal for each parameter is being delivered via said wire harness or said communication link.

4. An apparatus, as set forth in claim 1, wherein said processing means determines whether each sensor signal is being delivered via said wire harness or said communication link and responsively monitoring one of said wire harness and communication link for each sensor signal.

5. An apparatus for selectively receiving data from one of a plurality of sources, comprising:

a plurality of sensor means for producing sensor signals in response to sensed parameters;

instrument means for receiving a first group of one or more of said sensor signals via a wire harness;

control means for receiving a second group of one or more of said sensor signals and responsively delivering said second group to said instrument means via a communication link; and processing means for determining whether each sensor signal is being delivered via said wire harness or said communication link and for responsively monitoring one of said wire harness and communication link for each sensor signal, said processing means includes a plurality of flag means for indicating whether each sensor signal is being delivered via said wire harness or said communication link.

6. An apparatus, as set forth in claim 5, including means for producing a vehicle identification code and for delivering said vehicle identification code to said instrument means, and wherein said processing means senses a change in said vehicle identification code and responsively clears said plurality of flag means and determines whether the sensor signal for each parameter is being delivered via said wire harness or said communication link.

7. A method for selectively receiving data from one of a plurality of sources, comprising the steps of:

producing a plurality of sensor signals in response to sensed parameters;

delivering a first group of one or more of said sensor signals to a monitor via a wire harness;

delivering a second group of one or more of said sensor signals to a control and responsively delivering said second group from the control to the monitor via a communication link; and determining whether one of the sensor signals is being delivered via said wire harness or said communication link and responsively monitoring one of said wire harness and communication link.

8. A method, as set forth in claim 7, wherein said processing step includes the step of setting a plurality of flags for indicating whether each sensor signal is being delivered to the monitor via said wire harness or said communication link.

9. A method, as set forth in claim 8, including the steps of:

producing a vehicle identification code;

delivering the vehicle identification code to said instrument means; and sensing a change in the vehicle identification code and responsively clearing the plurality of flags and determining whether the sensor signal for each parameter is being delivered via the wire harness or the communication link.

* * * * *